June 20, 1961

A. R. M. E. RIGOINE DE FOUGEROLLES 2,989,159

CONNECTION BETWEEN TUBULAR MEMBERS

Filed July 12, 1956

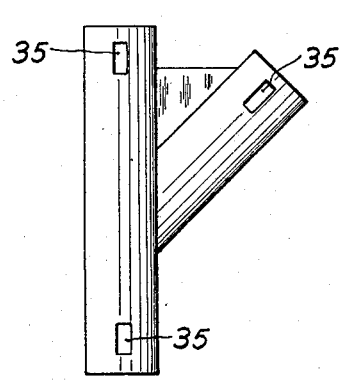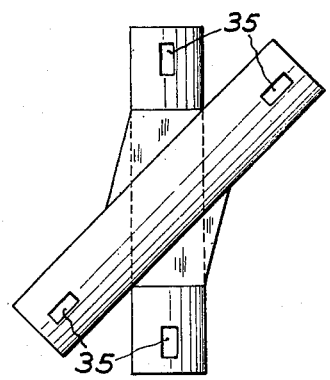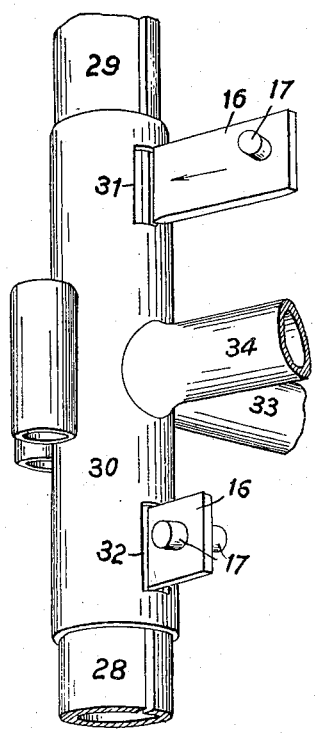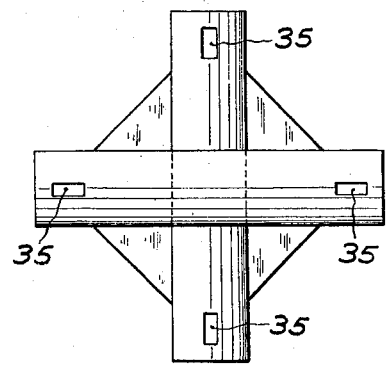

United States Patent Office 2,989,159
Patented June 20, 1961

2,989,159
CONNECTION BETWEEN TUBULAR MEMBERS
André René Marie Emile Rigoine de Fougerolles,
12 Quai de Passy, Paris, Seine, France
Filed July 12, 1956, Ser. No. 597,505
Claims priority, application France Feb. 14, 1956
3 Claims. (Cl. 189—36)

This invention is concerned essentially with erecting structures by assembling metal or plastic members without using nuts or bolts, the invention being characterized primarily by the use of longitudinally slit tubes of suitable thickness and diameter secured to connecting members with the assistance of wedging members adapted to be forced in-between the edges of the tube slits to expand the tube into locking engagement with the connecting members, these wedging members having a thickness slightly greater than the gap formed between these edges so as to be a tight fit therein.

According to a specific embodiment of the invention the slit tubular member is fitted freely in a tubular socket portion of a connecting member having at least one aperture formed in its wall, through which the aforesaid wedging member may be inserted to cause the inner tubular member to expand and lock itself against the inner surface of the socket, the relative friction thus created between the two tubes preventing any relative movement therebetween; thus, a wedging, an expansion, a friction and therefore a locking action are obtained simultaneously.

When erecting a structure of this character it is sufficient to apply a hammer-stroke on the wedging member to be inserted inbetween the edges of the slit tubular member for safely securing it in the desired position. The structure may be disassembled by merely using a lever to remove the wedging member and raleese the inner, slit tube from the socket in which it was secured.

This type of construction may be utilized in many different applications, notably for scaffolding, miscellaneous metal structures and also in the manufacture of a large number of metal articles.

The attached drawings forming part of this specification illustrate diagrammatically by way of example a few embodiments of the invention and reference will now be made thereto. In the drawings:

FIGURE 5 is another embodiment showing an assembling member of which FIG. 6 is an isometric view.

FIGURES 7, 8 and 9 show other elements adapted to be used in the construction of metal scaffoldings or like structures.

Figure 1:
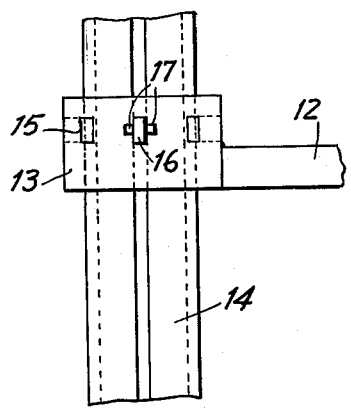
FIGURE 1 is a front view of a scaffolding element.

As illustrated in the drawings, a scaffolding or other demountable structure in accordance with the invention is made up of a plurality of struts and connecting members which are assembled to provide the particular structure desired. The struts are tubular and are split longitudinally, each having a narrow slot with parallel edges extending throughout the length of the tube. The walls of the struts are relatively thin and sufficiently resilient that the struts can be expanded by spreading the edges of the slots. The connecting members have cylindrical sockets of a diameter to receive the struts with a freely slidable fit where the struts are in unexpanded condition. Each of the sockets has at least one aperture which opens radially into the socket to receive a thin wedge which is inserted radially through the aperture and into the slot of a strut positioned in the socket. Forcing the wedge into the slot expands the strut into locking engagement with the socket so that the strut is locked against movement in any direction. The aperture in the socket has a circumferential extent greater than the width of the slot in the strut so that it does not interfere with forcing the wedge in. The taper angle of the wedge is sufficiently narrow that the wedge is retained in wedging position by frictional engagement with the edges of the slot but can be withdrawn to release the strut.

Figure 2:
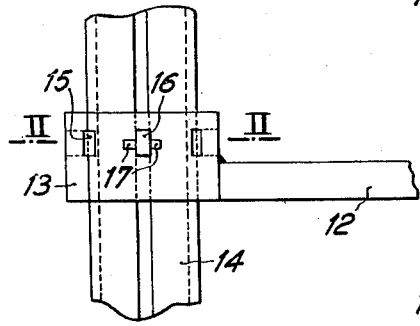
FIGURE 2 is a sectional view taken upon the line II—II of FIG. 1.

In the embodiment illustrated in FIGS. 1 and 2, the cross-members 12 are provided with an integral collar or socket portion 13 having an inner diameter very slightly greater than the outer diameter of the slit tubular members 14, so as to slide easily therealong before it is locked at the desired level. This collar portion is formed with a number of diametrical slots or like apertures 15, preferably disposed at spaced angular intervals (45° in the example illustrated) to afford any desired positions. Thus, by simply forcing a wedging member 16 through one of the collar slots and in the tube slit positioned within the collar—the thickness of the wedging member being slightly greater than the width of the tube slit—the slit tube will be safely locked in the outer collar 13 and held tightly therein. The wedging member 16 is preferably provided at its outer end with projections or pins 17 adapted to facilitate its removal by means of a lever when it is desired to dismantle the scaffolding or like structure.

Figure 3:
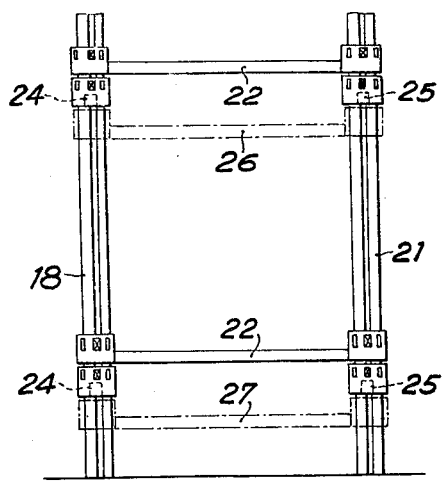
FIGURES 3 and 4 are side and plan views respectively of a scaffolding made from the elements shown in FIGS. 1 and 2.
Figure 4:
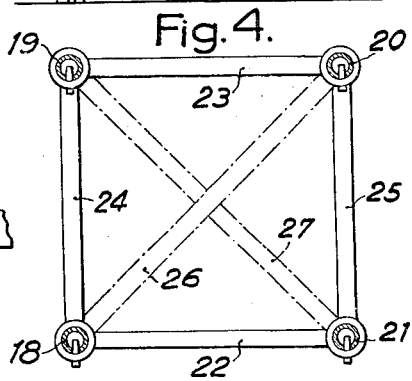

With the provision of the radial slots 15 spaced 45° from one another it is possible, as illustrated in FIGS. 3 and 4, to interconnect four slit tubes 18, 19, 20 and 21 though longitudinal bars 22, 23, transverse bars 24, 25 and oblique braces 26, 27. In this case, prefabricated ladders may be dispensed with as the necessary ones may be constructed on the site by using the aforesaid elements.

Figure 5:
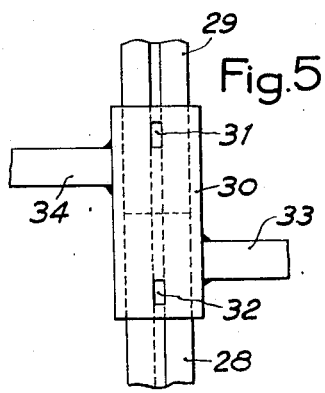

The vertical uprights consisting of superposed slit tubes 28, 29 may be interconnected through double collars or sockets 30, as illustrated in FIGS. 5 and 6 each formed with at least two radial slots 31, 32 through which wedging members such as 16 are forced, one member 16 serving the purpose of locking the tube 28 in the lower portion of the collar 30 and the other securing the tube 29 in the upper portion of this collar, as shown. If desired, the collar 30 may also be rigid—through welding or any other suitable means—with connecting bars 33, 34.

This method of assembling different metal structural members may be used in the construction of the most different types of metal structures made from slit tubes. To this end, it is possible to use connecting members of the type shown in FIG. 7 as a substitute for the conventional gussets, so that these members, also by inserting wedging members through their slots 35 and through the slit of the slit tubes to be assembled, will rigidly connect an oblique tube with straight tubes to provide a Y assembly. On the other hand, a connecting member of the type illustrated in FIG. 8 is also adapted to connect two tubes to provide an X-shaped assembly. Furthermore, a member of the type shown in FIG. 9 will connect a pair of tubes disposed at right angles. Similarly, by welding on a gusset, two or more collars provided with slots and having their axes properly directed it is possible to assemble slit tubes having any desired angular or relative positions.

Besides, this method is also applicable to the manufacture of collars that can be taken to pieces as a substitute for those now widely used in the construction of tubular scaffoldings.

The term "slit tube" designates in the foregoing any non-closed section, irrespective of its diameter and of the gap between the edges of its slit, provided that this gap cannot be expanded or contracted without creating a resilient force, this resilient force being actually utilized without the assistance of any screws, bolts or other fastening means, whether conventional or others, for connecting this slit tube to other structural elements and erecting the most different constructions. This resilient force may be obtained by inserting either a wedging member through the tube slit which tends to move the edges thereof away from each other, or an eccentric or cam member placed within the tube and adapted to be actuated for similarly widening the tube gap and expanding the tube metal.

The tubular members used for carrying out this invention may be of steel, light alloy or any other metals, or even plastic materials, and their cross-sectional shape and thickness may be selected with a view to obtain the required resilient force.

What I claim is:

1. A demountable structure comprising a tubular strut and a connecting member, said strut having a narrow slot extending longitudinally throughout the length of said strut and having parallel edges, said strut having a resilient wall permitting expansion of said strut by spreading said edges, said connecting member having a cylindrical socket of a diameter to receive said strut and further having an aperture which opens radially into said socket and has a circumferential extent greater than the width of said slot in said strut, and a wedge member inserted through said aperture and between the edges of the slot in said strut inserted in said socket, said wedge member being normal to the longitudinal axis of the strut and forced inwardly in a radial direction spreading said edges apart and thereby expanding said strut into locking engagement with said socket releasably locking said strut against movement in any direction relative to said socket, said wedge member having a narrow wedge angle and being retained in wedging position by frictional engagement with the edges of said slot.

2. A demountable structure comprising a thin walled tubular strut and a connecting member, said strut having a narrow slot extending longitudinally throughout its length and having parallel edges, said connecting member having a thin walled tubular socket portion of a diameter to receive said strut and further having a radial aperture in the wall of said socket portion, said aperture having a circumferential extent greater than the width of said slot in said strut, and a wedge member inserted through said aperture and between the edges of the slot in said strut positioned in said socket portion, said wedge member being normal to the longitudinal axis of the strut and forced inwardly in a radial direction spreading said edges apart and thereby expanding said strut into locking engagement with said socket portion releasably locking said strut against movement in any direction relative to said connecting member, said wedge member having a small wedge angle and being retained in wedging position by frictional engagement with the edges of said slot.

3. A demountable structure comprising a tubular strut having a narrow slot extending longitudinally throughout the length of said strut and having parallel edges, said slot having a resilient wall permitting expansion of said strut by spreading the edges of said slot, and a connecting member having a tubular socket portion of a diameter to receive said strut and further having a plurality of radial apertures in said socket portion, said apertures being circumferentially spaced around said socket portion, each of said apertures having a circumferential extent greater than the width of said slot, said strut being received in said socket portion and selectively positioned longitudinally and rotationally therein with said slot registering with a selected aperture in said tubular portion, and a wedge member inserted through said selected aperture and between the edges of the slot in said strut, said wedge member being normal to the longitudinal axis of said strut and forced inwardly in a radial direction spreading said edges apart and thereby expanding said strut into locking engagement with said socket releasably locking said strut in said selected position relative to said connecting member, said wedge having a narrow wedge angle and being retained in wedging position by frictional engagement with the edges of said slot.

References Cited in the file of this patent

UNITED STATES PATENTS

| | | |
|---|---|---|
| 608,715 | Roman | Aug. 9, 1898 |
| 1,095,858 | Harrison | May 5, 1914 |
| 1,164,161 | Ayers | Dec. 14, 1915 |
| 2,133,916 | Churchill | Oct. 18, 1938 |
| 2,208,049 | Pajeau | July 16, 1940 |
| 2,479,962 | Paulson | Aug. 23, 1949 |
| 2,716,804 | Johnson | Sept. 6, 1955 |
| 2,754,156 | Elderkin | July 10, 1956 |
| 2,798,284 | Mudd | July 9, 1957 |

FOREIGN PATENTS

| | | |
|---|---|---|
| 775,390 | France | Oct. 8, 1934 |
| 638,743 | Great Britain | June 14, 1950 |